United States Patent
Manaresi et al.

(10) Patent No.: US 6,301,570 B1
(45) Date of Patent: *Oct. 9, 2001

(54) PROGRAMMABLE FUZZY ANALOG PROCESSOR

(75) Inventors: Nicolò Manaresi; Eleonora Franchi, both of Bologna; Dario Bruno, Palermo; Rinaldo Poluzzi, Milan, all of (IT)

(73) Assignee: STMicroelectronics S.r.l., Agrate Brianza (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/638,371

(22) Filed: Apr. 26, 1996

(30) Foreign Application Priority Data

Apr. 28, 1995 (EP) ................................................ 95830171

(51) Int. Cl.[7] ........................................................ G06N 7/02
(52) U.S. Cl. ........................................................ 706/1; 706/9
(58) Field of Search ........................... 395/3, 900; 706/1, 706/9

(56) References Cited

U.S. PATENT DOCUMENTS

| | | | |
|---|---|---|---|
| 4,716,540 | 12/1987 | Yamakawa | 364/807 |
| 5,029,314 | * 7/1991 | Katsumi et al. | 355/208 |
| 5,073,863 | * 12/1991 | Zhang | 395/3 |
| 5,083,150 | 1/1992 | Nagasaki et al. | 354/402 |
| 5,128,769 | 7/1992 | Arai et al. | 358/228 |

(List continued on next page.)

FOREIGN PATENT DOCUMENTS

| | | | |
|---|---|---|---|
| 0 489 913 A1 | 6/1992 | (EP) | G05B/13/02 |
| 0 562 916 A1 | 9/1993 | (EP) | G05F/1/648 |
| 0 617 359 A1 | 9/1994 | (EP) | G06F/7/60 |
| WO 90/06547 | 6/1990 | (WO) | G05F/3/08 |

OTHER PUBLICATIONS

Fattaruso et al., "A Fuzzy Logic Interface Processor," IEEE Journal of Solid State Circuits, vol. 29, No. 4, Apr. 1994.*
Millman, Jacob, "Microelectronics: Digital and Analog Circuits and Systems", Jan. 1979.*

(List continued on next page.)

Primary Examiner—Kakali Chaki
Assistant Examiner—Wilbert Starks
(74) Attorney, Agent, or Firm—Theodore E. Galanthay; E. Russell Tarleton; Seed IP Law Group PLLC

(57) ABSTRACT

The analog processor of this invention is programmable and capable of storing the processing coefficients in analog form. It comprises a storage section having at least one output, plural outputs in most cases, and being adapted to respectively generate programming signals on such outputs; the storage section is input a plurality of supply voltage signals and is operative to produce, in connection with information stored therein, one of the supply voltage signals on each of the outputs, it being understood that one voltage signal may be produced on several such outputs. Advantageously, the processor can also be programmed in a simple manner from circuits of the digital type if switches controlled by storage elements are used in the storage section.

44 Claims, 7 Drawing Sheets

U.S. PATENT DOCUMENTS

| | | | | |
|---|---|---|---|---|
| 5,136,685 | * | 8/1992 | Nagazumi | 706/1 |
| 5,184,131 | * | 2/1993 | Ikeda | 341/165 |
| 5,228,111 | * | 7/1993 | Nagazumi | 706/9 |
| 5,243,687 | * | 9/1993 | Ando et al. | 395/900 |
| 5,247,472 | * | 9/1993 | Nagazumi | 364/807 |
| 5,249,258 | * | 9/1993 | Hisano | 395/3 |
| 5,274,191 | * | 12/1993 | Usa | 395/900 |
| 5,283,410 | * | 2/1994 | Kim | 364/148 |
| 5,289,367 | * | 2/1994 | Sasaki et al. | 395/900 |
| 5,313,291 | | 5/1994 | Appel et al. | 358/501 |
| 5,325,471 | | 6/1994 | Inoue | 395/127 |
| 5,388,190 | * | 2/1995 | Nakano | 395/900 |
| 5,412,752 | * | 5/1995 | Basehore et al. | 395/3 |
| 5,414,310 | | 5/1995 | Fattaruso | 327/62 |
| 5,416,709 | * | 5/1995 | Yeh et al. | 395/900 |
| 5,446,827 | | 8/1995 | Shigeoka et al. | 395/3 |
| 5,479,566 | * | 12/1995 | Ishimoto et al. | 395/3 |
| 5,515,476 | | 5/1996 | Nishidai et al. | 395/3 |
| 5,524,174 | * | 6/1996 | Eichfeld et al. | 395/3 |
| 5,570,456 | | 10/1996 | Landolt | 395/3 |
| 5,591,355 | * | 1/1997 | Ishikawa | 219/110 |
| 5,594,908 | | 1/1997 | Hyatt | 395/800 |
| 5,600,757 | * | 2/1997 | Yamamoto et al. | 395/900 |
| 5,702,059 | * | 12/1997 | Chu et al. | 235/462 |
| 5,706,351 | * | 1/1998 | Weinfurtner | 395/900 |

OTHER PUBLICATIONS

Tanenbaum, Andrew S., Structured Computer Organization, Prentice–Hall, Inc., Englewood Cliffs, New Jersey, Jan. 1984, pp. 11.*

Horowitz, Paul, The Art of Electronics, Second Edition, Cambridge University Press, Jan. 1989, pp. 852–858.*

Fattaruso et al, A Fuzzy Logic Inference Processor, IEEE Journal of Solid–State Circuits Apr., 1994.*

Yamakawa, "A Fuzzy Inference Engine in Nonlinear Analog Mode and Its Application to a Fuzzy Logic Control," *IEEE Transactions on Neural Networks 4(3)*:496–521, May 1993.

Huertas et al., "A Fuzzy Controller Using Switched–Capacitor Techniques," in Proceedings of the Second IEEE International Conference on Fuzzy Systems, IEEE Neural Networks Council, San Francisco, CA, Mar. 28–Apr. 1, 1993, pp. 516–520.

Fattaruso et al., "A Fuzzy Logic Inference Processor," International Conference on Industrial Fuzzy Control & Intelligent Systems, 1993.

Franchi et al., "Hardware and Software Integrated Toolkit for Low Cost Analog Fuzzy Controllers," $20^{th}$ International Conference on Industrial Electronics & Instrm., Sep. 1994.

Watanabe et al. "VLSI Fuzzy Chip and Inference Accelerator Board Systyems," $21^{st}$ International Symposium for Multiple–Valued Logic, 1991.

Catania et al., "A VLSI Fuzzy Inference Processor Based on a Discrete Analog Approach," *IEEE Transaction on Fuzzy Systems*, May 1994.

Sasaki, Mamoru and Fumio Ueno, "A Novel Implementation of Fuzzy Logic Controller Using New Meet Operation," in Proceedings of the Third IEEE Conference on Fuzzy Systems, IEEE World Congress on Computational Intelligence, Orlando, FL, Jun. 26–29, 1994, pp. 1676–1681.

* cited by examiner

PROGRAMMABLE FUZZY ANALOG PROCESSOR

TECHNICAL FIELD

This invention relates to an analog processor, and in particular to a fuzzy logic analog processor.

BACKGROUND OF THE INVENTION

In recent years, the analog processing of signals has grown in importance, especially with the advent of neural networks and fuzzy logic, and many attempts have been made, with varying degrees of success, at implementing and integrating processors which could carry out such processing.

Among the different problems posed by the making of processors which can perform well and, therefore, be of real commercial value, are the need for the processing to be unaffected by changes in temperature and variations in process parameters, and the programmability of the type of processing as identified by the values of processing coefficients.

The former problem has already been addressed, for example, by M. Sasaki and F. Ueno in an article "A Novel Implementation of Fuzzy Logic Controller Using New Meet Operation," Proceedings of the Third IEEE International Conference on Fuzzy Systems, Jun. 26–29, 1994, pages 1676–1681. The solution proposed there is based on the use of two independent reference signals, namely a current signal and a voltage signal. This is not easy to implement in any reliable manner if high performance is sought; the problem of programmability, moreover, is not addressed, nor is that of how to compensate for variations in the processing coefficients.

The latter problem has already been addressed, for example, by J. W. Fattaruso, S. S. Mahant-Shetti and J. Brock Barton in an article "A Fuzzy Logic Inference Processor," IEEE Journal of Solid-State Circuits, Vol. 29, No. 4, April 1994. This approach involves the use of at least one memory of the RAM type in which several processing coefficients are programmed by a "master" digital processor in digital form, as well as of various digital-to-analog converters. If a processor is to process analog input signals analogically and to output analog signals, storing the coefficients in digital form does not seem to be the natural and more convenient choice.

It is an object of this invention to provide a programmable analog processor having means of storing the processing coefficients in analog form.

SUMMARY OF THE INVENTION

The processor according to one aspect of this invention comprises a storage section having at least one output, most likely plural outputs, and being effective to respectively generate programming signals on such outputs. The storage section is input a plurality of supply voltage signals and is adapted to produce, on each of the outputs and in connection with information stored in the section, one of the supply voltage signals. It should be understood that one voltage signal may be produced on several of the outputs.

Advantageously, this processor can also be programmed by circuits of the digital type, in a simple manner, by providing switches in its storage section which are controlled by storage elements.

It is of further advantage that this programmable processor can be compensated for variations in the stored processing coefficients due to temperature and/or process parameters by providing, in a power supply section thereof, a feed-back structure locked to a reference potential which is stable against temperature and/or process parameters.

A noteworthy feature of the processor according to the invention is the linearity of its input-output characteristic with respect to a reference voltage being input to it from a power supply section. This suggests that it could be advantageous to extract this reference voltage by division from a signal indicating the width of the variation range of the input signals, to thereby achieve compensation for or independence of variations in this range of the programmable processor.

BRIEF DESCRIPTION OF THE DRAWINGS

The invention can be more clearly appreciated from the following description, to be taken in conjunction with the accompanying drawings, in which.

DETAILED DESCRIPTION OF THE INVENTION

The term "coupling" will be used hereinafter to comprehensively indicate a direct coupling, or an indirect coupling (i.e.. one established with the intermediary of circuit elements).

Figure 1:
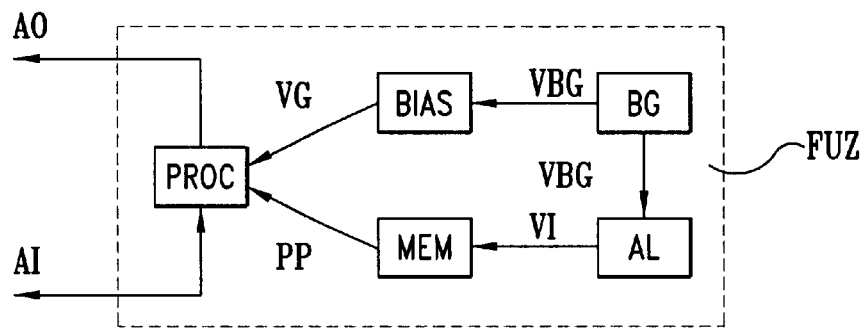
FIG. 1 is a block diagram of an analog processor according to the invention.

The architecture of this analog processor FUZ of the fuzzy type, shown in FIG. 1, is provided with a set AI of analog voltage inputs and a set AO of analog voltage outputs, and comprises: an analog processing section PROC connected to the inputs AI and the outputs AO; a storage section MEM which is connected to the section PROC to transfer programming signals PP and to control its operation; and a biasing section BIAS which is connected to the section PROC to transfer bias signals VG and to enable it to operate. It will be appreciated that the section MEM would become unnecessary where no programmability of the processor FUZ is sought, and that the degree of complexity of the section BIAS would vary with the level of its expected performance.

It is understood that digital-to-analog converters are provided upstream and analog-to-digital converters are provided downstream from the processor FUZ, if digital signals are to be received and generated.

The processor FUZ further comprises a power supply section AL connected to the section MEM to transfer supply signals VI for selective storage thereinto.

The processor FUZ may additionally include a voltage generator BG, specifically of the bandgap type, which would be connected to the section BIAS and the section AL in a suitable way to have them supplied with a stable reference potential VBG which is unaffected by temperature and the processor integration process. Any well-known bandgap circuit may be used. While many bandgap circuits are based on bipolar technology, those based on MOS technology may also be used. One such MOS technology based bandgap circuit is described in "A CMOS Bandgap Reference for Differential Signal Processing" by G. Nicollini and D. Senderowicz in IEEE Journal of Solid-State Circuits, Vol. 26, No. 1, January, 1991, pages 41–42. Alternatively, the potential VBG could be provided by external circuitry of the processor FUZ, or be extracted by division from a supply potential VDD, as more clearly explained hereinafter.

Processors of this type can be integrated and implemented to advantage with transistors of the MOS type. More complicated fabrication methods are available which admit of integration of both MOS and BJT transistors, so that such circuits may also include junction transistors, if necessary. A major advantage of integration is that transistors of one type can have similar performance and their characteristics determined by an area factor.

It will be appreciated that the architecture shown in FIG. 1 is a universal one which could also be used with other types of analog processors.

Figure 2:
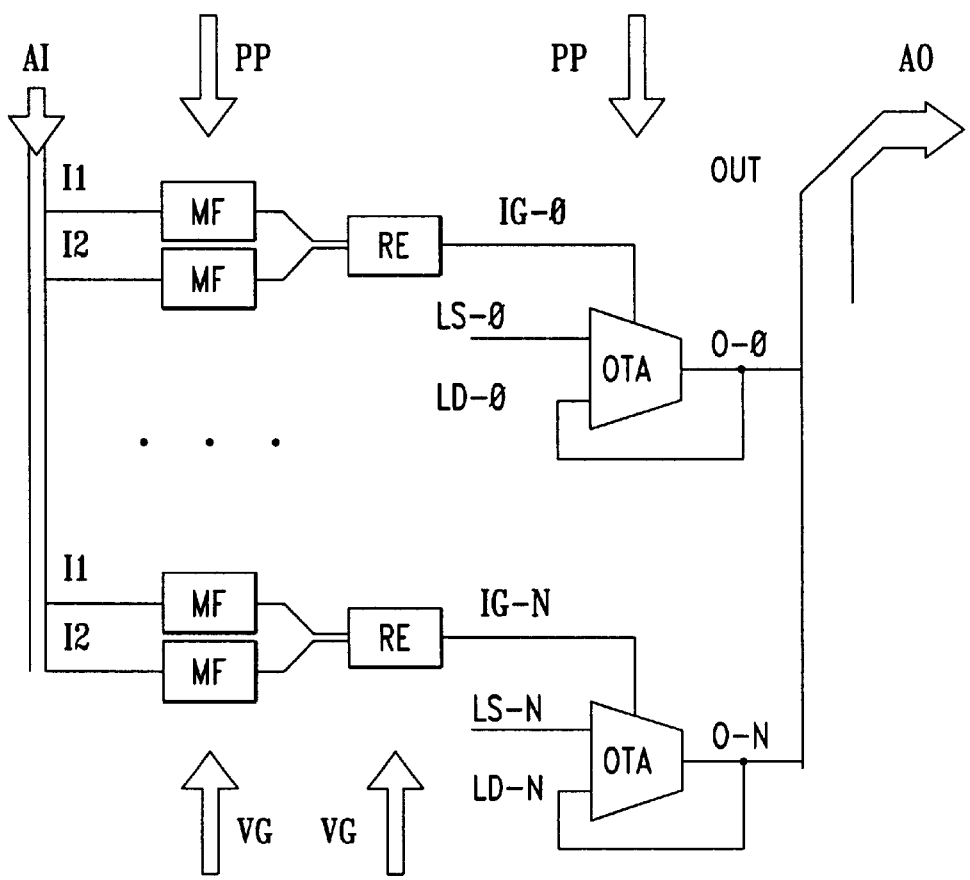
FIG. 2 is a block diagram of the processing section of the processor of FIG. 1.

Illustrated in greater detail by FIG. 2 is the architecture of the section PROC shown in FIG. 1 for the specific instance of the set AI consisting of first and second analog voltage inputs, I1 and I2, and the set AO consisting of a single analog voltage output, OUT.

A fuzzy processor, and precisely the analog processing section PROC, can usually process a plurality of rules (numbered 0 to N), and in any case at least one rule. The diagram of FIG. 2 shows one horizontal circuit block for each rule, and for simplicity, only the first and last rule blocks have been respectively indicated. These rule blocks are connected together in parallel, both input- and output-wise. Where two outputs are provided, a first set of rule blocks would have their outputs connected together in parallel and to a first of such outputs, and a second set of rule blocks have their outputs paralleled and connected to the second of such outputs. The construction of just one rule block will, therefore, be described hereinafter. The rule block for fuzzy logic rule 0 in FIG. 2 comprises a pair of membership function or fuzzyfier circuits MF and one complement or evaluation circuit RE which process the antecedent part of rule 0, and a defuzzyfier circuit OTA which processes the consequent part of rule 0. As will become apparent from the discussion of circuits that follows, the output of the rule block is responsive to the threshold voltage of the MOS transistors, the bias signals VG, temperature and the integration process parameters.

In general, for each input of the set AI there is provided a corresponding fuzzyfier or membership function circuit MF, input-wise connected thereto and effective to output an electric signal which depends on the value of a corresponding membership function of the fuzzy type. Thus, in the particular instance of a single input, there will be a single circuit MF provided for each rule block.

The circuit MF can be input programming signals PP which establish the shape of the membership function. It is fairly common practice to select membership functions of trapezoidal shape. In this case, the programming parameters can determine the locations of the trapezoid corners.

The membership function is of such a type that, for each value of the electric signal input to the circuit MF, a single value of the electric signal is output from the circuit MF.

For each block, an evaluation or complement circuit RE is provided which has inputs connected to the outputs of the rule block circuits MF and is effective to output an electric signal which is tied to the truth level of the corresponding rule.

Finally, for each block, a defuzzyfier circuit OTA is provided which has a control input IG connected to the output of the circuit RE and an output O connected to the output OUT. This defuzzyfier OTA has a first signal input LS receiving one of programming signals PP and a second signal input LD which is coupled to its output O. The signal PP supplied to the input LS determines the weight of the rule evaluated within the rule block relative to the output.

FIG. 2 illustrates diagrammatically the fact that the biasing section BIAS supplies the bias signals VG in particular to the circuits MF and RE. As shown in FIG. 2, the outputs of all defuzzyfier circuits are connected together to define an output node OUT. The symbol AI stands for Analog Input and corresponds to a set of inputs for respective analog signals and symbol AO stands for Analog Output and corresponds to a set of outputs for respective analog signals; in FIG. 2 symbol AO is associated to a big arrow to which a number of electrical connections arrive but only two are depicted; all the single outputs of the "N" Operational Transconductance Amplifiers OTA are electrically connected together to the same single electrical connection; other electrical connections may arrive from other sets of OTA not depicted in FIG. 3.

Figure 3:
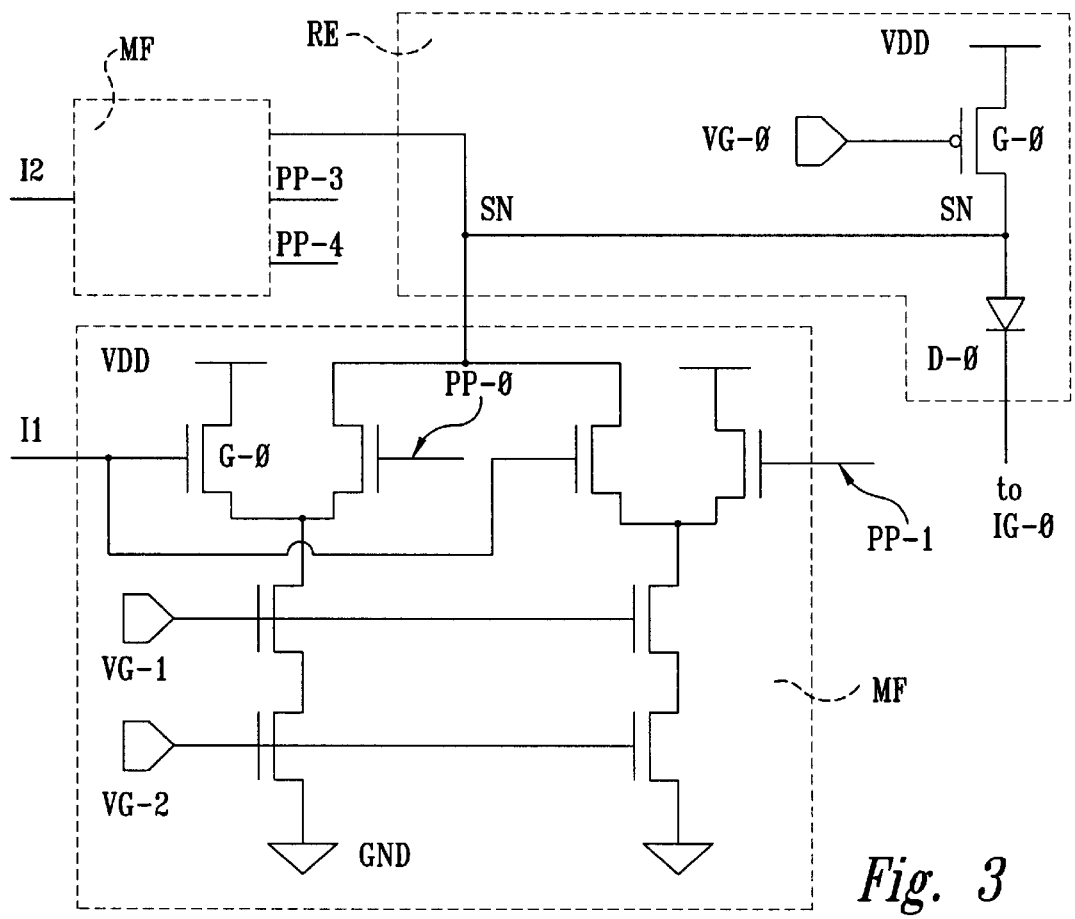
FIG. 3 is a circuit diagram of the fuzzyfier circuit and the evaluation circuit of the processing section shown in FIG. 2.

FIG. 3 shows a circuit diagram of the fuzzyfier circuit MF and the evaluation circuit RE associated with the first rule block.

The circuit MF comprises two substantially identical (but for mismatch of the circuit elements) differential transconductor circuits each consisting of two N-channel input MOS transistors having source terminals connected to each other and to a current generator, control terminals connected to the differential inputs, and one drain terminal connected to a supply potential VDD, the other drain terminal being connected to the output of the transconductor circuit. The current generator consists of two N-channel MOS transistors having main conduction paths connected in series between a ground potential GND and the source terminals of the input transistors. By having two MOS transistors connected in series, a current generator can be provided which has a very high output resistance, when one of the transistors is operated within the linear range and the other operated within the saturation range.

The first analog input I1 is connected to a first voltage differential input of both transconductor circuits. The second voltage differential inputs of the transconductor circuits receive, respectively, a first programming voltage signal PP-0 and a second programming voltage signal PP-1 from the section MEM, the value of the two programming signals determining the horizontal location of the midpoint of each oblique side of the trapezoid corresponding to the membership function. In principle, the section MEM is to generate two programming signals PP for each circuit MF contained in the processor FUZ.

The control terminals of the current generator transistors respectively receive a first bias voltage signal VG-2 and second bias voltage signal VG-1 from the section BIAS. The value of the first signal VG-2 determines the current of the current generator, that is the transconductor circuit bias current that corresponds to the height of the trapezoid, while the value of the second signal VG-1 should be adequate to hold the associated transistor at saturation. In principle, it will be sufficient that the section BIAS only generates two signals VG for all the circuits MF of the processor FUZ. Furthermore, where the output resistance is no parameter of interest, a single MOS transistor, and hence a single signal VG, would suffice. However, different signals VG may be provided for different rule block circuits MF, if desired.

The current outputs of the two transconductor circuits are connected together and to the output of the circuit MF, and are selected to be complementary of each other, that is, not on the homologous side. Thus, when the voltage at the input I1 is lower or higher than the voltage of both signals PP-0 and PP-1, the current output to the circuit MF will be the same as the current generated by the current generator.

FIG. 3 shows a second circuit MF, identical to the first, which is connected to the input 12 and is input two additional programming signals, PP-3 and PP-4.

The outputs of the two circuits MF are input to the circuit RE.

The circuit RE basically comprises a transistor G-0 of the MOS type. In the circuit of FIG. 3, the transistor G-0 is a P-channel type and has its source terminal connected to the supply potential VDD and its drain terminal connected to a summing node SN. The node SN is connected to the circuits MF.

The control terminal of the transistor G-0 receives a bias voltage signal VG-0 from the section BIAS. The value of the signal VG-0 should be such that the current generated by the transistor G-0 at saturation is slightly less than the current generated by the current generators of the transconductor circuits of the circuits MF; a factor of 0.8 would undoubtedly provide a safe margin.

The node SN is connected to the output of the circuit RE via a diode D-0 which is used as a unidirectional conduction circuit element. This may be implemented, for example, by a diode-connected transistor of the MOS type. A current will appear at the circuit RE output which has a non-zero value equal to that of the current generated by the transistor G-0, when all the output currents of the circuit MF are zero, i.e., all of the conditions for membership are met.

In principle, it will be sufficient for the section BIAS to only generate one signal VG-0 for all the circuits RE of the processor FUZ. If desired, however, different signals VG-0 may be provided for different rule block circuits RE.

Figure 4:
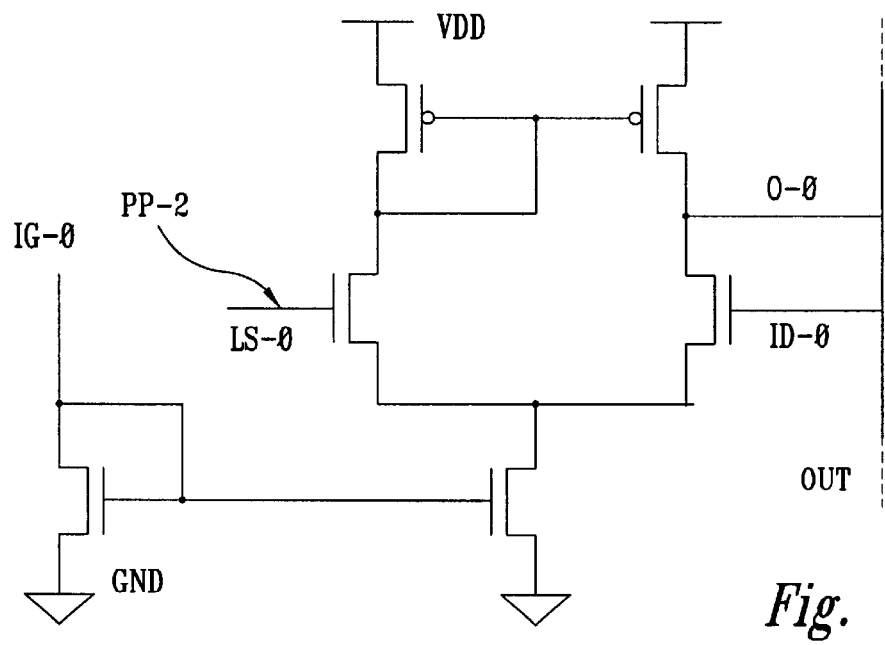
FIG. 4 is a circuit diagram of the defuzzyfier circuit of the processing section shown in FIG. 2.

Shown in FIG. 4 is a circuit diagram of the defuzzyfier circuit OTA associated with the first rule block.

This basically comprises a transconductance operational amplifier and includes a current output O-0, a first signal voltage input LS-0, a second signal voltage input LD-0, and a control current input IG-0. The input IG-0 is connected to the output of the circuit RE, the input LD-0 is connected to the output O-0, and the input LS-0 receives a programming signal PP-2 from the section MEM. The value of the signal PP-2 determines the weight of the rule evaluated within the rule block relative to the output.

The transconductance operational amplifier comprises two input transistors of the N-channel MOS type which have control terminals respectively connected to the inputs LS-0 and LD-0. These transistors are connected to a load consisting of a first current mirror locked up to the supply potential VDD, and are biased by a second current mirror locked up to the ground potential GND. The output of the second current mirror is then connected to the input transistors, and its input connected to the input IG-0.

In the present embodiment, all of the plural outputs O-0, . . . , O-N are connected together and to the single output OUT of the processor FUZ. The potential which develops at the output OUT will be of such value that the sum of the currents generated and drawn by the circuits OTA of the various rule blocks is nil. Accordingly, it will be necessary for that output OUT to be connected to a high-impedance load, or alternatively, that an output buffer be used.

Figure 5:
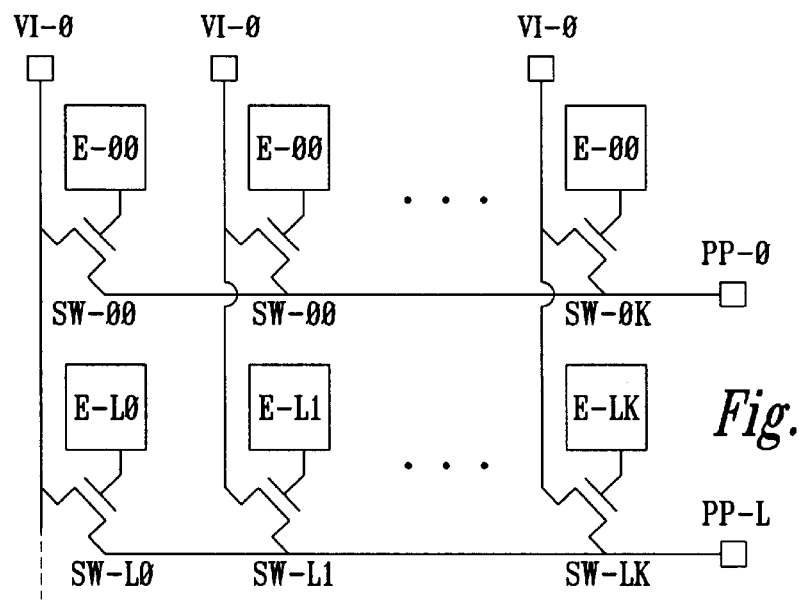
FIG. 5 is a block diagram of the storage section of the processor shown in FIG. 1.

FIG. 5 is a block diagram of the storage section MEM.

This section MEM has a plurality of inputs which receive supply voltage signals, denoted by VI-0, . . . , VI-K, and a plurality of outputs to generate programming voltage signals, denoted by PP-0, . . . , PP-L, and is effective to supply, in connection with information stored therein, one of the signals VI to each output. The number of the signals VI and the signals PP is quite variable and dependent on the individual application, being of one as a minimum.

The section MEM comprises a plurality of controlled switches SW-00, . . . , SW-LK, equal in number to the product of the number of signals VI and signals PP. These switches are implemented, for example, by transistors of the MOS type. The section MEM further comprises a corresponding plurality of storage elements E-00, . . . , E-LK having outputs respectively connected to the control terminals of the switches SW. In FIG. 5, both the switches SW and the elements E are arranged into a logical and preferably physical matrix having an equal number of columns to the inputs and equal number of rows to the outputs.

According to the contents of the storage elements E, some of the switches SW will be closed and some open.

Each switch is connected on one side to an input and on the other side to an output, so that when closed, the input signal can be transferred to the output. Proper operation requires that one switch only in each row be closed, whereas several switches may be closed at one time in each column.

Assuming K+1 different values for the supply voltage signals VI, the programming signals PP will take one of the K+1 values in accord with the contents of the elements E.

It would be possible for the elements E to be simple links to either the supply potential VDD or the ground potential GND.

In a still simpler way, the aggregate of a switch SW and an element E could consist of a direct link between an input and an output. Thus, the section MEM would be made up of a first set of leads for the columns and a second set of leads for the rows, as well as of connection contacts between the rows and the columns at locations dependent on the type of processing sought by the processor FUZ.

Alternatively, the elements E may comprise flip-flops of the D type, connected together into at least one shift register; in this way, storing contents into the elements E through simple control circuitry and a minimum number of terminals (for the processor) becomes a straightforward matter. One shift register may be provided for each row, so that the value of one signal PP at a time can be modified.

In a further alternative, the elements E could be memory cells connected into a matrix; in this way, the circuit complexity of the elements E would be alleviated, but at the expense of increased complexity of the control circuitry for the address, write and, possibly, read functions, and of an increased number of terminals (for the processor).

A compromise between the two alternatives just described consists of using memory cells connected into a matrix and address circuitry including one or more counters so as to simulate in part a shift register by means of the matrix.

Figure 6:
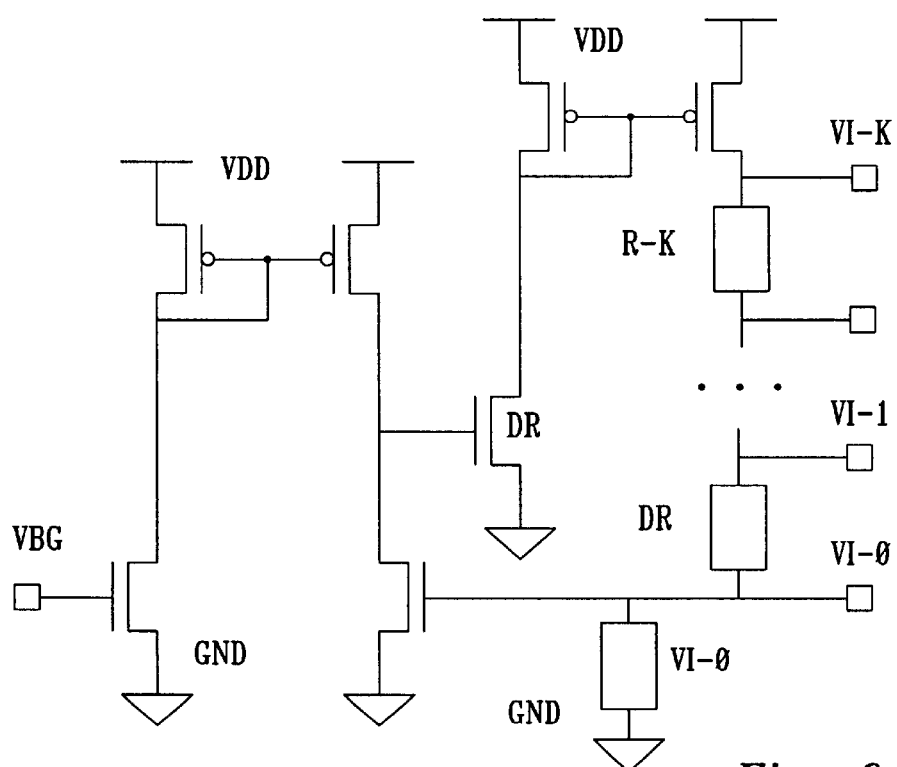
FIG. 6 is a circuit diagram of the power supply section for the processor in FIG. 1.

FIG. 6 is a circuit diagram of the power supply section AL.

This section AL comprises a voltage divider formed of a plurality of resistors R-0, . . . , R-K which have a corresponding plurality of intermediate taps from which supply voltage signals VI-0, . . . , VI-K can be output.

The voltage divider is connected on one side to the ground potential GND and on the other side to the output of a first current mirror locked up to the supply voltage VDD.

The input of the first current mirror is driven by the drain terminal of a transistor DR of the N-channel MOS type which has its source terminal connected to the ground potential GND.

The section AL further comprises a comparator consisting of a second current mirror locked up to the supply voltage VDD and connected to ground via two input transistors of the N-channel MOS type. The control terminal of one of the two input transistors receives the reference potential VBG, while the control terminal of the other is connected to an intermediate tap of the divider and, in the specific instance of FIG. 6, receives the supply voltage signal VI-0. A comparator such as this ensures that, in steady state operation, the corresponding potentials to its two inputs be the same.

A feedback loop is then formed by connecting the control terminal of the transistor DR to the output of the second current mirror of the comparator, whose operation will not, therefore, be significantly altered by virtue of the low drain from the transistor DR.

If the drain of current at the outputs of the section AL is negligible compared to the current flowing through the divider (an easily met condition because the load on such outputs is formed by gating currents of MOS transistors), then the current at the mirror output is given by the ratio of the reference potential VBG to the resistance of the resistor R-0. Thus, the values of the signals VI are easily calculated and quite stable because they are dependent on a resistance ratio; in general, they will e selected equispaced from the ground potential GND and the supply potential VDD.

Figure 7:
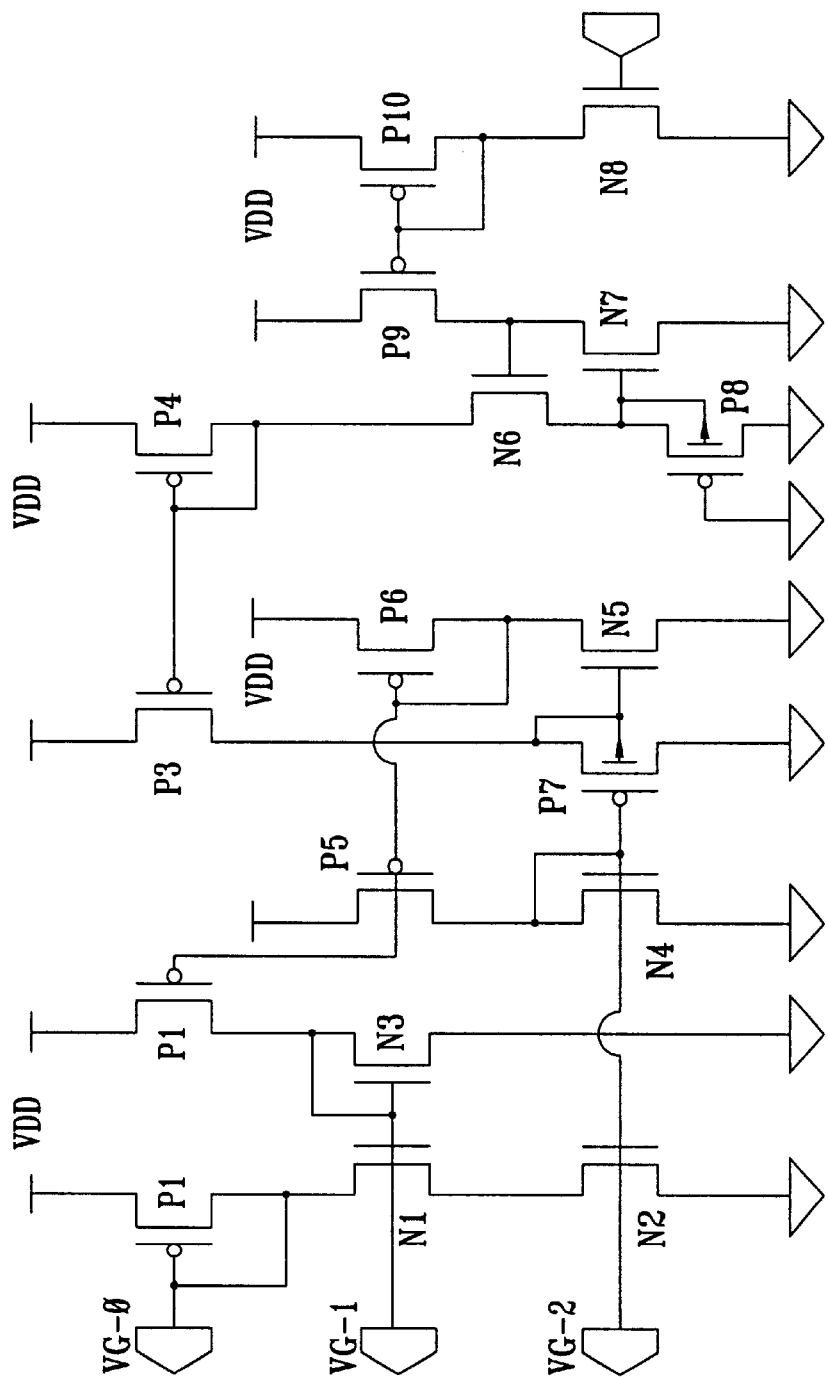
FIG. 7 is a circuit diagram of the biasing section of the processor in FIG. 1.
Figure 8:
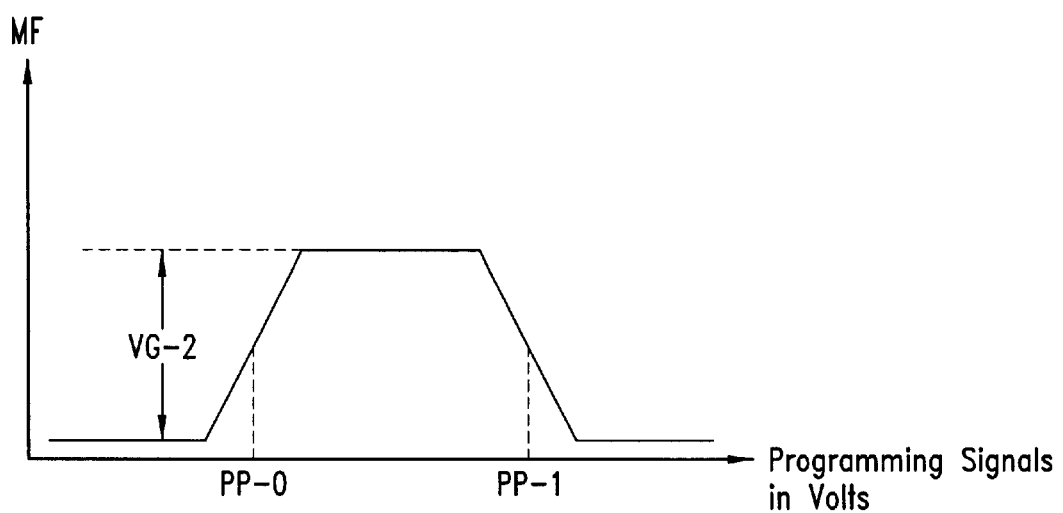
FIG. 8 illustrates a membership function as determined by various programming signals.

FIG. 7 shows a circuit diagram of the biasing section BIAS.

The bias circuit section BIAS receives the reference potential VBG as input and outputs the bias signals VG for the section PROC. As shown in FIG. 7, three bias signals are generated, VG-0, VG-1, VG-2, and the section BIAS is preferably only formed of transistors of the MOS type. The three bias signals are all temperature independent and are used to bias the current generators of the membership function circuits MF and the complement circuits RE as described in more detail below.

The section BIAS includes an N-channel transistor N8 which receives the potential VBG on its control terminal, and has its source terminal connected to the ground potential GND and its drain terminal connected to the input of a first current mirror formed of two P-channel transistors P9 and P10 and being locked up to the potential VDD. The output of this first current mirror is connected to the control terminal of an N-channel transistor N6 and to the drain terminal of an N-channel transistor N7 having its source terminal connected to the potential GND. The source terminal of the transistor N6 is connected to the control terminal of the transistor N7 and to the source terminal of a P-channel transistor P8 having control and drain terminals connected together and to the potential GND, and a substrate terminal connected to the source terminal to prevent any body effect. The drain terminal of the transistor N6 is connected to the input of a second current mirror formed of two P-channel transistors P3 and P4 and being locked up to the potential VDD. The output of this second mirror is connected to the source and substrate terminals of a P-channel transistor P7 having its drain terminal connected to the potential GND. The output of the second mirror is also connected to the control terminal of an N-channel transistor N5 having its source terminal connected to the potential GND. The control terminal of the transistor P7 is connected to the control terminals of an N-channel transistor N4 having its source terminal connected to the potential GND and of an N-channel transistor N2 having its source terminal connected to the potential GND. The drain terminal of the transistor N5 is connected to the input of a third current mirror with a double output which is formed of P-channel transistors P2, P5, P6 and locked up to the potential VDD; a first output of this third mirror is connected to the drain and control terminals of the transistor N4, and the second output of this third mirror is connected to the drain and control terminals of an N-channel transistor N3 having its source terminal connected to the potential GND. The control terminal of the transistor N3 is connected to the control terminal of an N-channel transistor N1 having its source terminal connected to the drain terminal of the transistor N2. The drain terminal of the transistor N1 is connected to the drain and control terminals of a P-channel transistor PI having its source terminal connected to the potential VDD.

The signals VG-0, VG-1, VG-2 correspond to the potential (as related to the potential GND) of the control terminals of the transistors P1, N1, N2, respectively.

The signal VG-2 determines the bias current of the differential transconductor circuits of the circuits MF, and has a value substantially equal to the sum of a first voltage proportional to the potential VBG and a second voltage proportional to the threshold voltage of the N-channel MOS transistors.

The value of the signal VG-1 is of no great importance, provided that it can, under all conditions, hold the transistors it is driving within their saturation range.

Relatively unimportant is also the value of the signal VG-0; in fact, a consideration of the transistor PI and the transistors G-0. G-N of the various circuits RE reveals that these form Ncurrent mirrors all of which are input the same current, i.e., the current which is flowing through the two transistors N1 and N2. Thus, the important proportional relationship between the current of the two differential transconductor circuits of the circuits MF and the current of the MOS transistor of the circuit RE will be ensured by the fact that the signals VG-1 and VG-2 are supplied both to the control terminals of the transistors N1, N2 and to the control terminals of the transistors which make up the current generators of the differential transconductor circuits.

The processor FUZ just described has an input-output characteristic which is compensated for temperature and absolute variations in the process parameters, this being achieved by the use of a single reference signal, namely the reference potential VBG.

This may be justified by the inputs AI and outputs AO being adapted to handle voltage signals; furthermore, the programming signals PP and bias signals VG also are voltage signals.

In addition, the fact that the inputs AI and outputs AO handle voltages makes for easier cascade interconnection of several processors.

That the reference signal must be a voltage one is an advantage because stable potentials are much easier to generate than stable currents.

It will be appreciated that, for the purpose of providing compensation, it is necessary that the membership function "breakdown" points (in the example shown, the corners of the trapezoid) be kept at fixed points of the input range.

It will be apparent, therefore, that if the input voltage values at which the rules become active are not constant, variations are bound to occur in the input-output characteristic of the processor.

In the example shown, for this condition to be met, it is necessary that the bias current for the transconductor circuits of the circuit MF be steadily proportional to the common factor k' of the N-channel MOS transistors, and that the current generated by the P-channel MOS transistor of the circuit RE be steadily proportional, i.e., tied by a steady factor of proportionality, to that bias current. Furthermore, this factor should be less than unity.

With this bias current being generated by a transistor of the N-channel MOS type, the voltage VGS of that transistor is required to be proportional to the sum of a voltage which is stable from all aspects, such as the voltage at the output of a bandgap generator, and a voltage proportional to its threshold voltage.

Where programmability of the processor is sought, it is further necessary that the programming voltage signals be also stable from all aspects, if the input-output characteristic is to be compensated. This can be achieved by extracting such signals from the output of a bandgap type of generator.

A highly interesting feature of this processor is that, if a supply potential VDD (which usually is not stable) is used to generate the reference potential VBG and passed to a voltage divider (e.g., a resistive one in view of the division ratio being eminently controllable and constant), the input-output characteristic would closely retain its shape as the supply potential varies. Where the input signals and output signals are to be tied to the supply potential, the absolute variations would be null relative variations; this is, in fact, no rare occurrence.

More generally, if a signal is provided which indicates the width of the variation range of the input signals, and which varies linearly with that width, then the signal can be used to generate the potential VBG which controls in a linear fashion the "size" of the input-output characteristic of the processor, and as a result, the width of the variation range of the output signals as well. Thus, a processor can be provided which is compensated for such variations in width.

One example will now be given to illustrate the inventive concept; this is for illustration only and not to limit the scope of the invention. With reference to FIG. 2, I1 and I2 are voltage signals linked in general to inputs AI (e.g., A1 and A2) by way of an operation of shifting and bufferization and therefore may vary with continuity within a certain range. In this example, inputs AI vary between 0 volt and 2 volt, signals II between 1.8 volt and 3.8 volt. IG-N are current outputs of the blocks RE each evaluating the antecedent part of a different rule.

Figure 9:
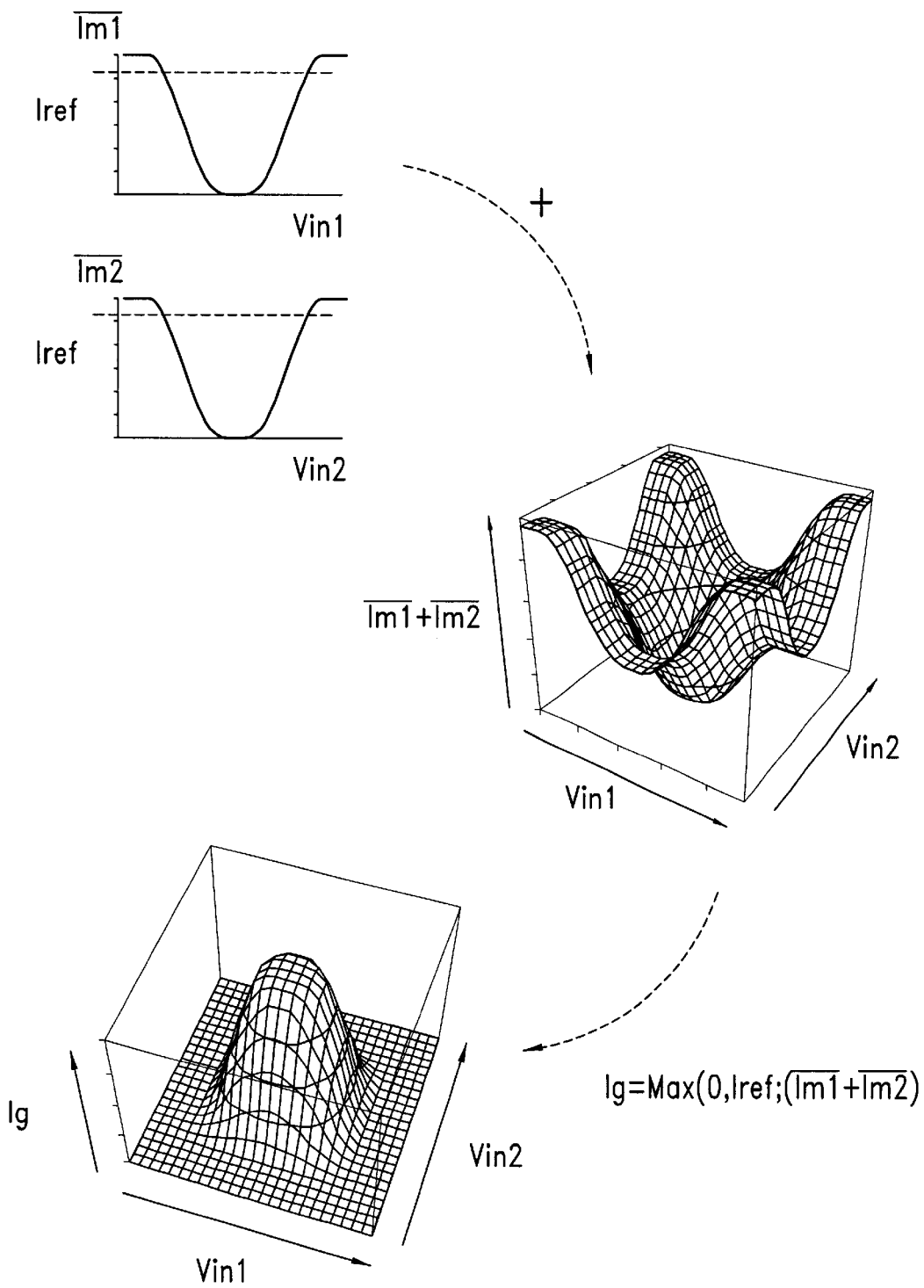
FIG. 9 illustrates the processing carried out by the fuzzyfier circuits and evaluation circuits according to programming parameters stored in the storage section of the processor in FIG. 1.

The processing carried out by these blocks is shown in FIG. 9; the output of each MF block has the shape of a trapezoid with concavity pointing upwardly. The maximum value of the output is fixed by the value of the current flowing in the current generators of the blocks MF controlled by the signals VG-1 and VG-2. The position of both edges of the trapezoid is determined by the programming parameters PP (particularly PP-0 and PP1 in FIG. 3). In block RE the output currents of blocks MF are summed and complemented to a reference value. The value of the reference current of block RE is fixed by transistor G-0 biased by voltage V-0 (in FIG. 3 only two MF blocks are depicted though more blocks may be presented).

The output AO is linked to the value of the potential of node OUT by way of an operation of shifting, amplification and bufferization. In particular AO varies between 0 volt and 2 volt, OUT between 2 volt and 3.5 volt. In stable condition the voltages LD-i are all equal to the voltage OUT. The output currents O-i are such that their sum equal 0, and they are a function of IG-i and of the difference between LS-i and LD-i. The value LS-i represents the value, that is programmable, of the "consequence" associated to the rule and is derived from block MEM. There is a programming value for each rule (PP-2 in FIG. 4). Therefore each rule requires a number of programming parameters PP equal to one (1) plus the number of inputs (AI) multiplied by 2; the global number of parameters is equal to said last calculated number multiplied by the number of rules.

The values E-Ik in FIG. 5 may be 0 or 1 corresponding to the status OFF or ON of the switches SW-Ik. Particularly, in each row only one switch may be ON so establishing the connection between signal PP-I and a predetermined value VI-k. In FIG. 6 the values VI-Ik are determined by the series connection of resistors whose extreme terminals are connected to potentials having a value independent from temperature derived from a bandgap (VBG). In this example, VI-k=4.16 volt, VI-0=1.44 volt, K=136, and the step is therefore 20 mV.

Figure 10:
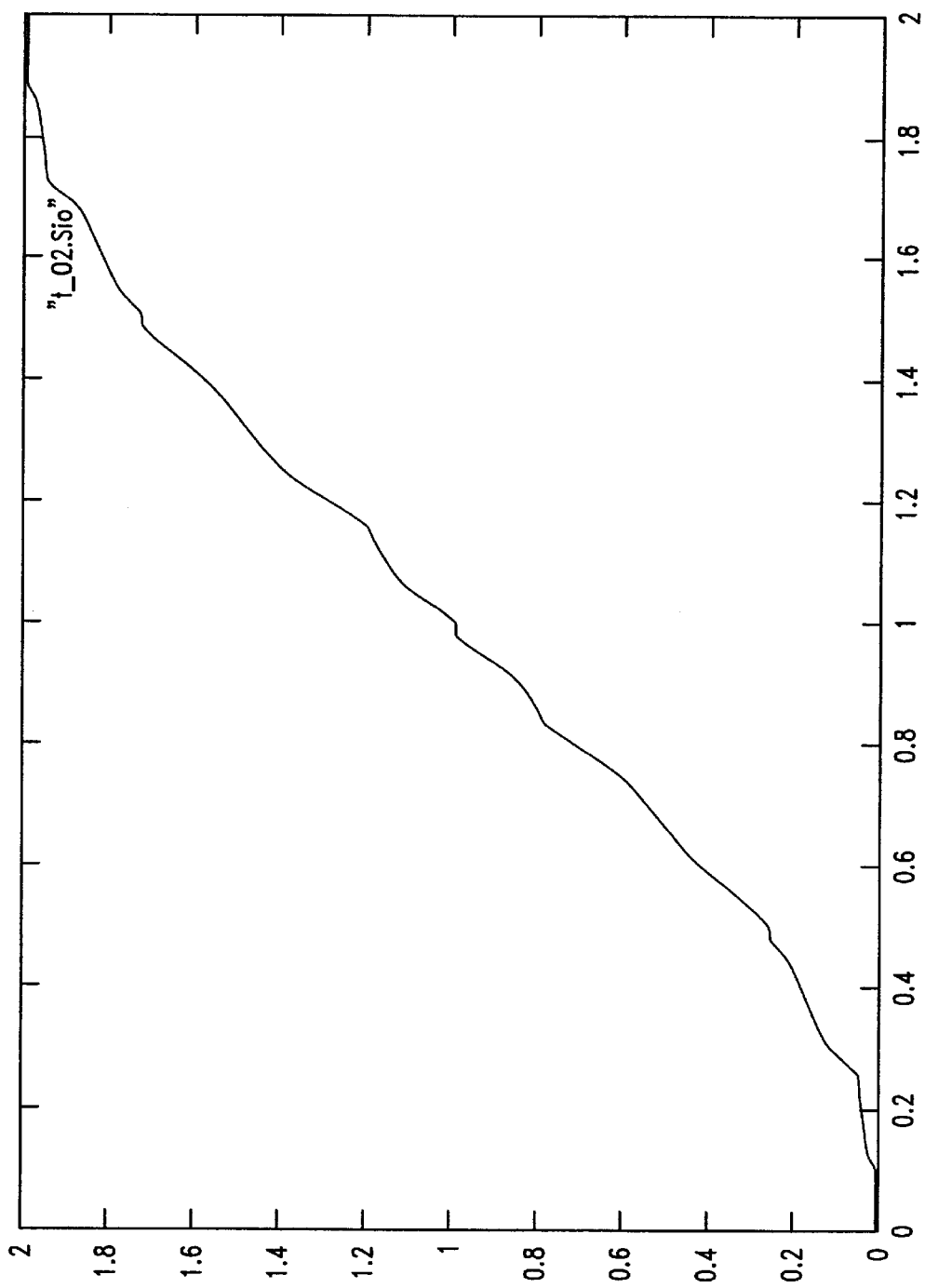
FIG. 10 is a graph of an output of the processor of FIG. 2.

The circuit may be used for implementing an ARCSIN or $SIN^{-1}$ function. The measured output is represented in FIG. 10 with one input and seven rules.

Values of programming parameters are given by the following:

| Antecedent part: | PP-0 | PP-1 |
|---|---|---|
| First Rule: | 1.60 | 2.12 |
| Second Rule: | 2.04 | 2.42 |
| Third Rule: | 2.20 | 2.62 |
| Fourth Rule: | 2.46 | 3.12 |
| Fifih Rule: | 2.96 | 3.38 |
| Sixth Rule: | 3.12 | 3.54 |
| Seventh Rule: | 3.48 | 3.90 |
| Consequent part: | PP-2 | |
| First Rule: | 2.00 | |
| Second Rule: | 2.08 | |
| Third Rule: | 2.32 | |
| Fourth Rule: | 2.74 | |
| Fifth Rule: | 3.16 | |
| Sixth Rule: | 3.40 | |
| Seventh Rule: | 3.50 | |

Values of coefficients E in the storage device MEM with K=136:

1111111111111111111111111111101111111111111 . . .
1111111111111111111111111111111111111101111 . . .
0111111111111111111111111111111111111111111 . . .
1111111111111111111111111111111111111111110 . . .

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A fuzzy logic analog processor, comprising:
a processing circuit operable to process at least one fuzzy logic rule, the processing circuit having at least one continuous-time analog voltage, a programming input, and at least one continuous output, the programming input for receiving a programming signal that defines a membership function of the fuzzy logic rule;
a storage circuit including storage elements having at least one output and a plurality of continuous analog inputs each receiving one of a plurality of continuous voltage signals, the storage circuit being operable to provide at its output one of the plurality of continuous voltage signals as the programming signal according to information stored in the storage circuit; and having a shift register; and
wherein the storage elements include flip-flops connected to the shift register.

2. The fuzzy logic analog processor according to claim 1 wherein the storage elements include memory cells.

3. The fuzzy logic analog processor according to claim 1, further comprising a voltage supply circuit coupled to the processing circuit, and that receives a temperature stable reference voltage and generates the plurality of continuous voltage signals.

4. The fuzzy logic analog processor according to claim 3 wherein the voltage supply circuit comprises:
a voltage divider having a plurality of intermediate laps from which the plurality of continuous voltage signals are provided;
a current mirror connected to the voltage divider; and
a comparator having a first input connected to a temperature stable reference voltage and a second input connected to one of the plurality of intermediate taps, and an output connected to the current mirror.

5. The fuzzy logic analog processor according to claim 1, further comprising a voltage supply circuit that receives a temperature stable reference voltage and generates the plurality of voltage signals, and a bias voltage supply circuit configured to combine a temperature-stable voltage associated with a temperature-stable reference voltage and a threshold-dependent voltage to generate the at least one temperature-stable bias voltage signal.

6. An analog processor, in particular of the fuzzy type, having at least one continuous-time analog input and at least one continuous-time analog output, and comprising:
a continuous-time processing section which is connected to said at least one continuous-time analog input and at least one continuous-time analog output, is input at least one continuous-time analog voltage programming signal, and is adapted to process signals of the analog type, the outcome of such processing being at least dependent on said at least one continuous-time analog voltage programming signal; and
a storage section having at least one continuous-time analog output and being adapted to respectively generate said continuous-time analog voltage programming signal on said output, said storage section being input a plurality of supply continuous-time voltage signals and being adapted to produce, in connection with information stored therein, one of said supply continuous-time voltage signals as the continuous-time analog voltage programming signal on said continuous-time analog output of said storage section; and
wherein said storage section comprises at least a plurality of controlled switches and at least a corresponding plurality of flip flops connected to at least one shift register and having outputs respectively connected to said switches, and is adapted to output, in connection with the contents of said storage elements and through said switches, one of said supply continuous-time voltage signals as the continuous-time analog voltage programming signal.

7. The processor according to claim 6, further comprising a voltage supply section which is input a stable reference potential and is adapted to generate said plurality of supply continuous-time voltage signals and a bias voltage supply circuit configured to combine a temperature-stable voltage associated with a temperature-stable reference voltage and a threshold-dependent voltage to generate the at least one temperature-stable bias voltage signal.

8. The processor according to claim 7 wherein said supply section comprises:
a voltage divider having a plurality of intermediate taps from which said plurality of supply voltage signals are provided;
a current mirror effective to bias said divider;
a transistor effective to drive said mirror; and
a comparator having a first signal input coupled to said reference potential, a second signal input coupled to one of said intermediate taps, and an output coupled to the control terminal of said transistor.

9. The processor according to claim 6 wherein the processor is integrated and implemented with transistors of the MOS type and the processor further comprises a biasing section connected to said processing section and adapted to provide bias therefor by means of at least one voltage signal substantially corresponding to the sum of a voltage proportional to the threshold voltage of the MOS transistors and a temperature-stable voltage proportional to a temperature-stable reference potential.

10. The processor according to claim 9 wherein said reference potential is extracted by division from a signal indicating the width of the variation range of the input or output signals, in particular from a supply potential.

11. The processor according to claim 6 wherein said processing section comprises a plurality of rule blocks having outputs which are coupled together and to said at least one output, each rule block comprising:
at least one fuzzyfier circuit respectively coupled to said at least one continuous-time analog input;
an evaluation circuit coupled to an output of said at least one fuzzyfier circuit; and
a defuzzyfier circuit coupled to an output of said evaluation circuit and having its output coupled to the output of the rule block.

12. The processor according to claim 11 wherein said defuzzyfier circuit comprises a transconductance type of operational amplifier having a current output connected to the output of said defuzzyfier circuit, a first signal input receiving a programming voltage signal from said storage section, a second signal input coupled to its output, and a control input coupled to the output of said evaluation circuit.

13. The processor according to claim 11 wherein said evaluation circuit comprises a transistor of the MOS type having its source terminal coupled to either a supply or ground potential reference, its control terminal coupled to said biasing section, and its drain terminal coupled to a summing node, said summing node being coupled to the output of said at least one fuzzyfier circuit, and said node being further coupled to the output of said evaluation circuit via a unidirectional conduction circuit element.

14. The processor according to claim 11 wherein said fuzzyfier circuit comprises two differential transconductor circuits being substantially identical with each other and having mutually complementary current outputs, and each having a first signal input, a second signal input, and at least one control input for controlling the circuit bias current, said first inputs being coupled together and to said at least one input, said second inputs respectively receiving two programming voltage signals from said storage section, said control inputs being coupled together and to said biasing section, and said outputs being coupled together and to the output of said fuzzyfier circuit.

15. A fuzzy logic circuit comprising:
a continuous-time processing circuit having an input structured to accept an analog voltage input, an output structured to deliver an analog voltage output, and a programming signal input structured to receive programming signals, the processing circuit structured to evaluate the analog voltage input in light of the programming signals and produce the analog voltage output; and
a programming signal generator having a set of programming voltage inputs, and having a set of programming signal outputs coupled to the programming signal input of the processing circuit, the programming signal generator including a plurality of switches, each switch coupled to exactly one of the set of programming voltage inputs at a first terminal and exactly one of the set of programming signal outputs at a second terminal and structured to couple or not couple the first terminal to the second terminal depending on a state of the switch.

16. The fuzzy logic circuit of claim 15 wherein the plurality of switches are MOS transistors each including a respective gate terminal.

17. The fuzzy logic circuit of claim 16 further comprising a plurality of storage devices respectively coupled to the gate terminal of the plurality of MOS transistors.

18. The fuzzy logic processor of claim 17 wherein at least some of the plurality of storage devices are flip-flops.

19. The fuzzy logic processor of claim 18 further comprising a shift register coupled to the flip-flops and structured to enable storing of data into the flip-flops.

20. The fuzzy logic processor of claim 17 wherein at least some of the plurality of storage devices are semiconductor memory devices.

21. The fuzzy logic circuit of claim 15 wherein the set of programming inputs are patterned in columns, wherein the set of programming signal outputs are patterned in rows, and wherein exactly one of the plurality of switches in each row is coupled to its respective column.

22. The fuzzy logic circuit of claim 15 further comprising:
a voltage divider including:
an input voltage terminal structured to accept a temperature-stable voltage reference;
a plurality of resistors coupled as a resistor ladder in series from a first supply voltage to a reference voltage; and
a plurality of resistor taps coupled respectively between the plurality of resistors and the set of programming voltage inputs of the programming signal generator.

23. A fuzzy logic circuit comprising:
a continuous-time processing circuit having an analog voltage input, an analog voltage output, and a programming signal input structured to receive membership functions, the processing circuit structured to operate on signals received at the analog voltage input based on the membership functions and produce a fuzzy logic signal at the analog voltage output; and
a membership function program generator coupled to the processing circuit, the membership function program generator having a set of temperature stable voltage inputs arranged in column form, and having a set of membership function program outputs arranged in row form, the membership function program generator including a plurality of switches, each switch coupled between one of the temperature stable voltage inputs and one of the membership function outputs and each switch structured to selectively couple the one of the temperature stable voltage inputs to the one of the membership function program outputs responsive to a state of the switch.

24. The fuzzy logic circuit of claim 23 wherein the plurality of switches are MOS transistors each including a respective gate terminal.

25. The fuzzy logic circuit of claim 23 further comprising a plurality of storage devices respectively coupled to the gate terminal of the plurality of MOS transistors.

26. The fuzzy logic processor of claim 25 wherein at least some of the plurality of storage devices are data flip-flops.

27. The fuzzy logic processor of claim 26 further comprising a shift register coupled to the flip-flops, the shift register structured to enable storing of data into the data flip-flops.

28. The fuzzy logic processor of claim 25 wherein at least some of the plurality of storage devices are semiconductor memory devices.

29. A MOS fuzzy logic processor comprising:
an analog processing circuit having a set of analog inputs and structured to generate an analog output based on a comparison of input signals received at the set of analog inputs with membership functions generated by a membership function circuit that establishes the membership functions based on a set of analog voltages received at a set of programming inputs; and
a programming section, separate from the processing circuit and including
a plurality of generated analog voltages at a respective plurality of voltage terminals,
a plurality of programming voltage outputs coupled to the set of programming inputs of the analog processing circuit, and
a plurality of coupling devices, each device structured to couple one of the plurality of generated analog voltages to one of the plurality of programming voltage outputs, when activated.

30. The fuzzy logic processor of claim 29 wherein the plurality of generated analog voltages are a set of static analog voltages, each of the static analog voltages available at a respective one of the voltage terminals.

31. The fuzzy logic processor of claim 30 wherein the set of static analog voltages include k voltages having voltage values between a ground voltage and a supply voltage.

32. The fuzzy logic processor of claim 31 wherein the k voltages are equally spaced between the ground voltage and the supply voltage.

33. The fuzzy logic processor of claim 29 wherein the plurality of generated analog voltages are thermally stable with respect to the input signals received at the set of analog inputs of the analog processing circuit.

34. The fuzzy logic processor of claim 29 wherein the coupling devices are fabricated contact structures.

35. The fuzzy logic processor of claim 29 wherein the coupling devices are memory devices.

36. The fuzzy logic processor of claim 35, wherein the memory devices are programmable.

37. The fuzzy logic processor of claim 29, wherein the coupling devices comprise latch circuits coupled to switching devices.

38. A MOS fuzzy logic processor comprising:
  an analog processing circuit having a set of analog inputs and structured to generate an output based on a comparison of the set of analog inputs with a membership function circuit that establishes a set of membership functions based on analog voltages received at a set of programming inputs; and
  a programming section, separate from the processing circuit and including
    a plurality of generated analog voltages,
    a plurality of programming voltage outputs coupled to the set of programming inputs of the analog processing circuit, and
    means for selectively coupling one of the plurality of generated analog voltages to one of the plurality of programming voltage outputs.

39. The fuzzy logic processor of claim 38 wherein the means for selectively coupling one of the plurality of generated analog voltages to one of the plurality of programming voltage outputs is responsive to an electrical signal.

40. The fuzzy logic processor of claim 38 wherein the means for selectively coupling one of the plurality of generated analog voltages to one of the plurality of programming voltage outputs is programmable.

41. The fuzzy logic processor of claim 38 wherein the plurality of generated analog voltages are a set of static analog voltages, each of the static analog voltages available at a respective circuit node in the programming section of the fuzzy logic processor.

42. A method of programming a fuzzy logic processor that has an analog input, the method comprising:
  generating a plurality of continuous static analog voltage signals at a corresponding plurality of voltage contacts within a programming section of the fuzzy logic processor;
  selecting a particular one of the plurality of continuous static analog voltage signals to be a programming signal for a particular membership function;
  coupling the particular one of the plurality of continuous static analog voltage signals to a programming terminal in the programming section; and
  coupling the programming terminal of the programming section to a membership function generating circuit in a processing section of the fuzzy logic processor.

43. The method of claim 42, further comprising:
  accepting the analog input at a set of input terminals in the processing section of the fuzzy logic processor;
  coupling the analog input to the particular membership function;
  comparing the analog input with the membership function; and
  generating an analog output of the fuzzy logic processor based on the comparison of the analog input with the membership function.

44. The method of claim 42, further comprising:
  repeatedly
  selecting a particular one of the plurality of continuous static analog voltage signals to be a particular programming signal for a particular membership function;
  coupling the selected static analog voltage signals to programming terminals in the programming section in a one-to-one relationship; and
  coupling the programming terminal of the programming section to membership function generating circuits in the processing section of the fuzzy logic processor;
  until a selected number of the membership function generating circuits in the processing section of the fuzzy logic processor are coupled to at least one of the plurality of continuous static analog voltage signals.

* * * * *

UNITED STATES PATENT AND TRADEMARK OFFICE
CERTIFICATE OF CORRECTION

PATENT NO. : 6,301,570 B1  Page 1 of 1
DATED : October 9, 2001
INVENTOR(S) : Nicolo Manaresi et al.

It is certified that error appears in the above-identified patent and that said Letters Patent is hereby corrected as shown below:

Column 11,
Line 33, "plurality of intermediate laps" should read -- plurality of intermediate taps --

Column 14,
Line 21, "circuit of claim 23" should read -- circuit of claim 24 --

Signed and Sealed this

Fourteenth Day of May, 2002

Attest:

JAMES E. ROGAN
Attesting Officer  Director of the United States Patent and Trademark Office